United States Patent
Prodam et al.

(10) Patent No.: US 9,798,942 B2
(45) Date of Patent: Oct. 24, 2017

(54) BIOMETRIC RECOGNITION METHOD WITH SPEED AND SECURITY FEATURE SUITABLE FOR POS/ATM APPLICATIONS

(71) Applicant: UNICREDIT S.p.A., Rome (IT)

(72) Inventors: Riccardo Prodam, Milan (IT); Marcello Paris, Rome (IT); Marco Berini, Massa-Carrara (IT)

(73) Assignee: UNICREDIT S.p.A., Rome (IT)

( * ) Notice: Subject to any disclaimer, the term of this patent is extended or adjusted under 35 U.S.C. 154(b) by 140 days.

(21) Appl. No.: 14/653,145

(22) PCT Filed: Dec. 20, 2012

(86) PCT No.: PCT/IT2012/000389
§ 371 (c)(1),
(2) Date: Jun. 17, 2015

(87) PCT Pub. No.: WO2014/097330
PCT Pub. Date: Jun. 26, 2014

(65) Prior Publication Data
US 2015/0332274 A1    Nov. 19, 2015

(51) Int. Cl.
*G06K 9/00* (2006.01)
*G06F 17/30* (2006.01)
(Continued)

(52) U.S. Cl.
CPC ... *G06K 9/00926* (2013.01); *G06F 17/30876* (2013.01); *G06F 21/32* (2013.01);
(Continued)

(58) Field of Classification Search
CPC .......... G06K 9/00926; G06K 9/00979; G06K 9/00087; G06K 2009/00939;
(Continued)

(56) References Cited

U.S. PATENT DOCUMENTS

| | | |
|---|---|---|
| 2010/0045788 A1 | 2/2010 | Zhang et al. |
| 2012/0057763 A1 | 3/2012 | Horng et al. |
| 2014/0196118 A1* | 7/2014 | Weiss .................. H04L 63/0846 726/4 |

FOREIGN PATENT DOCUMENTS

EP    1 752 930 A2    2/2007

OTHER PUBLICATIONS

International Search Report for corresponding International Patent Application No. PCT/IT2012/000389 dated Dec. 20, 2012.
(Continued)

*Primary Examiner* — Amandeep Saini
(74) *Attorney, Agent, or Firm* — Merchant & Gould P.C.

(57) ABSTRACT

A method quickly recognizes a person by identification codes derivable from biometric data includes registering and recognizing at least one user from multiple registered users by a recognition event. Each user registration event includes acquiring from biometric data correlated to a configuration of the user's blood vessels. Acquired biometric data is encoded into a respective registration identification code associated to the user. The user is registered the associated registration identification code is registered. Each recognition event includes acquiring the biometric data correlated to the user's blood vessels. The acquired biometric data is coded into a respective recognition identification user code. Based on the registered identification codes, a comparison set of comparison identification codes is prepared. Then the recognition identification code is compared with each comparison identification code. A respective matching level for each comparison is estimated. The user is recognized or refused recognition based on the estimated matching levels.

25 Claims, 2 Drawing Sheets

(51) Int. Cl.
*G06F 21/32* (2013.01)
*H04L 29/06* (2006.01)
*G06Q 20/20* (2012.01)
*G06Q 20/10* (2012.01)
*G07F 19/00* (2006.01)
*G06Q 20/40* (2012.01)

(52) U.S. Cl.
CPC ..... *G06K 9/00087* (2013.01); *G06K 9/00979* (2013.01); *G06Q 20/1085* (2013.01); *G06Q 20/20* (2013.01); *G06Q 20/206* (2013.01); *G06Q 20/40145* (2013.01); *G07F 19/20* (2013.01); *H04L 63/0861* (2013.01); *G06K 2009/00932* (2013.01); *G06K 2009/00939* (2013.01)

(58) Field of Classification Search
CPC ..... G06K 2009/00932; G06Q 20/1085; G06Q 20/206; G06Q 20/40145; G06Q 20/20; H04L 63/0861; G06F 17/30876; G06F 21/32; G07F 19/20
USPC .......................................................... 382/115
See application file for complete search history.

(56) References Cited

OTHER PUBLICATIONS

Lakshmi, C. et al., "An Algorithm for Improved Accuracy in Unimodal Biometric Systems through Fusion of Multiple Feature Sets", *ICGST-GVIP Journal*, 9(III): 33-40, (2009).

Wang, K. et al., "Hand Vein Recognition Based on Multi Supplemental Features of Multi-Classifier Fusion Decision", *Proceedings of the 2006 IEEE International Conference on Mechantronics and Automation*, 1790-1795, (2006).

Kumar, A. et al., "Biometric Authentication based on Infrared Thermal Hand Vein Patterns", *Digital Image Computing: Techniques and Applications*, 331-338, (2009).

Zhou, Y. et al., "Human Identification Using Palm-Vein Images", *IEEE Transactions on Information Forensics and Security*, 6(4): 1259-1274, (2011).

\* cited by examiner

BIOMETRIC RECOGNITION METHOD WITH SPEED AND SECURITY FEATURE SUITABLE FOR POS/ATM APPLICATIONS

TECHNICAL BACKGROUND OF THE INVENTION

Field of Application

The present invention relates to the field of methods, based on the acquisition and electronic processing of biometric data, for recognizing the users of services, the use of which requires a registration and an authorisation. In particular the invention relates to a method of registering and recognizing users of POS (Point Of Sale) and ATM/Cashpoint services, as well as a method for providing such services.

The invention further relates to a recognition system which carries out the above method, as well as POS and ATM systems which comprise such recognition system.

Description of the Prior Art

In the context of the offer of services the use of which requires recognition and authorization, the need and convenience of using recognition and/or identity verification and/or authorization methods, based on the acquisition and processing of biometric data, is increasingly perceived.

In particular, such need is felt in the field of payment-related services, in the commercial context, such as POS (Point Of Sale) type services, or in the field of the services commonly offered by banks for the automatic withdrawal of cash from current accounts, such as Cashpoint/ATM (Automated Teller Machine) type services.

In the existing known POS and/or ATM systems, a card-holder (holder of a credit card or debit card) can access a service through two phases, the first of which entails the use of said card, the second of which is a confirmation of the card-holder's identity, by typing an identification numerical/alphanumerical code, such as a PIN or password. The identity confirmation (after the identity verification, i.e. "authentication", process) provides that the recognition system first recognizes the user, through traditional card-based methods, then recalls the pre-registered identification code (PIN or password) of the recognized user, and finally compares the pre-registered identification code and the code typed in by the user.

In this framework, it is possible to envisage replacing the identification code with a biometric datum of the user.

To such purpose, numerous solutions for the verification of a user's identity based on the acquisition and processing of biometric data are known, in particular derived from the field of identity verification for security purposes (for example, to permit or not entrance to restricted access areas, or to access or not to confidential information in an IT system).

Such known solutions referred to are various, both as regards the biometric datum that is used (for example, fingerprint, or eye iris or electrocardiographic or respiratory frequency/pattern, or frequency/typing pressure on a keyboard) and as regards the algorithms that are employed for performing comparison and recognition (typically, analytical pattern-matching algorithms).

A first problem which arises, if one wished to apply such prior solutions for the identity verification in the context of POS/ATM, is that of implementing acquisition procedures that are sufficiently quick, simple and user-friendly, such as to prove attractive for the user. This requirement, by itself, excludes a large part of the aforementioned known solutions.

A second problem, even more hindering with respect to the needs felt in the context of POS/ATM services, is the fact that the aforementioned solutions relate to the function of identity verification or authentication, in the sense explained above, but do not however satisfy the need to "recognize" the user. In fact, for a "recognition service" the user must be identified without first having to introduce a presentation of him/herself, e.g., by inserting a credit or debit card. The demand for a recognition service is perceived as very important, for POS/ATM services, having the basic objective to even avoid the need to use a card.

The solutions focused on identity verification, known to the state of the art and described above, are absolutely unable to satisfy such demand.

It should be noted, in fact, that an identity verification service entails a mere "one-to.one" comparison between biometric data acquired from the user and biometric data previously registered by the same user.

On the contrary, a recognition service entails a "one-to-many" comparison between biometric data acquired from the user and a plurality of previously registered biometric data, belonging to all the users registered for a given service. Such plurality may be very numerous: in the context of POS/ATM services, the number of registered users (for example, clients of a bank) is typically hundreds of thousands or even millions of people.

Such quantitative data gives an idea of how much difference there is between the requirements to be met by a biometric method for verifying identity and by a biometric method for recognition, and allow to clearly understand the reason for which the solutions developed for the former are absolutely inapplicable to the latter.

The most critical problem that arises regards the duration of the recognition process, which requires a huge number of comparisons, instead of just one, before coming up with the result, so that the idea of simply repetitively perform the biometric methods for identity verification (such as those mentioned above) a number of times in sequence, as a recognition method, is unfeasible.

Faced with this problem, no feasible solutions can be found even resorting to prior solutions in other fields, such as solutions based on the acquisition of digital fingerprints of a person to be recognized and on the scanning of a database of digital fingerprints to find a matching. Such solutions, used for example for legal investigations, entail a recognition process duration which is longer, by several orders of magnitude, compared to the recognition process duration required for POS/ATM services, which is acceptable if it last, at most, few seconds.

Moreover, the aforementioned solutions do not always ensure a sufficient degree of recognition reliability for POS/ATM applications.

It is to be noted in fact that POS/ATM services, being related to payments or money transactions, require a very high degree of reliable recognition, comparable to that offered by the current solutions using cards with PIN/password confirmation. This is a urgent requisite for the providers of such services, such as banks.

The objective of eliminating PIN/password and the card, while maintaining a level of recognition reliability sufficient for such applications and relying on biometric data, is a technical challenge which has not yet been resolved.

With regard to the requirement of reliability, it is important to note that current POS/ATM terminal, as already observed, actually performs recognition by means of a PIN/password, which are identification codes that can be defined definable as "exact", since they can be regenerated in an identical, deterministic manner, at every recognition event.

Conversely, biometric data are identification codes that can be defined as "non-exact", because in this case there cannot be a deterministic and absolute identity between the recorded data and the data acquired during the recognition phase. One might use the analogy of a photograph: the photographs of a person are always different from each other, despite referring to the same person.

The fact of obtaining reliable recognition results, approaching those obtainable from exact identification codes, but using non-exact identification codes is a technical objective not currently achievable by the prior art.

The requirements of reliability and speed, imposed by a recognition method for POS/ATM services, are not resolved even by solutions recently proposed to make the acquisition of biometric data easy and quick, such as the solutions based on the acquisition of images of the user's hand palm.

For example, the patent application US 2012/0057763 illustrates a system of such type, using deterministic algorithms (SITF, convolution processes) to extract a plurality of biometric characteristics from the acquired image. The considered is an identity verification, wherein the single "one-to-one" comparison that is required is performed by means of a plurality of single comparisons.

The patent application US 2010/0045788 illustrates a further system of such type, to using analytical algorithms (such as the Kong algorithm based on Gabor filters) so as to express an approximate "pattern similarity" evaluation, for example by means of a function "distance". Such system too makes comparisons of a plurality of biometric characteristics, derived from several images (images of the palm and images of the vein pattern, which must both be acquired), in order to achieve acceptable degrees of reliability.

In general, systems of the aforementioned known type use analytical algorithms (for example representing by means of equations the hand surfaces and detecting characteristic points on the hand surface) which try to approximate as a number, such as a "distance", a "degree of similarity" to perform an identity comparison check. Consequently, in order to achieve an degree of reliability acceptable for the task of identity verification, they are compelled to make several comparisons, on a plurality of biometric characteristics, for each single "matching" comparison.

This entails an increase of the quantity of data to be stored for acquired each image, and an increase of the number of basic comparisons needed for each single identity check.

For these reasons, even should it prove possible to apply such systems in the context of a "one-to-many" recognition service (in the sense illustrated above), such solutions are not applicable (moreover, it is not even conceivable to apply them) in the context of services which require the recognition of a user among thousands, or hundreds of thousands, or even millions of users, such as that considered by the present invention.

In brief, it can be asserted that a biometric recognition method such as to meet the requirements of an application in the context of POS/ATM must have several characteristics: a simple and fast acquisition of the biometric datum; a processing speed such as to enable very quick recognition; a high degree of accuracy and reliability of such recognition.

None of the solutions of the prior art mentioned above is able to simultaneously satisfy all such aforementioned requirements, nor to offer a performance trade-off which is close to what is required.

Therefore, the scope of the present invention is to devise and make available an improved method of registration and quick recognition of a user, which is able to satisfy the aforementioned requirements and to overcome the drawbacks described above with reference to the prior art. It is also a scope of the present invention to devise and make available a method of providing a service, using the aforementioned method of recognition, which proves to be particularly efficient. The achievement of the aforementioned scope further allows the achievement of the further scopes to devise and make available a system for a quick recognition of a user and to provide POS and ATM services, in turn improved in such a way as to satisfy the aforementioned requirements, overcoming the drawbacks related to the mentioned prior art.

SUMMARY OF THE INVENTION

The method of registration and recognition according to the invention is aimed preferably at a field of application regarding POS/ATM services (already defined above), in relation to which its advantages are particularly deployed. The terms "user recognition" (and therefore as "recognition service" and "recognition method") indicates in this description the capability to recognize the user without the need for the user to previously introduce his/her presentation.

However, such method may also be applied in the context of other services which envisage the recognition of one user out of a multitude of registered users.

In addition, the method can also be used for identity and/or authorization check functions, providing a "one-to-one" comparison of biometric data. In fact, when reference is made to an "identification code" and to a "recognition service", this also includes the sub-case of confirmation of the user's identity and, similarly, of a confirmation service of the user's identity that can be exploited, for example, for authorization purposes.

According to one embodiment of the method, this not only comprises the recognition of the user but also the identification of the user, that is to say an association of the recognized user with a record of user identification data needed to provide the service (comprising, for example, a current account number). Such embodiment gives a basis for the method of providing a service also comprised in the invention.

BRIEF DESCRIPTION OF THE DRAWINGS

Further characteristics and advantages of the method of registration and recognition, of the method of providing a service, of the system for recognition of a user of a service, and of systems for providing ATM/POS services according to the invention will be more clearly comprehensible from the description given below of its preferred and non-limiting embodiments, with reference to the annexed drawings, wherein.

DETAILED DESCRIPTION

A method for registration and quick recognition of a user of a service, by means of identification codes derivable from biometric data, will now be described.

Such method, first of all, provides the phase of registering a user, by means of a respective registration event.

Each registration event comprises the steps of acquiring from the user to be registered at least one biometric datum correlated to a configuration of the user's blood vessels; then encoding, by means of a coding procedure, the at least one acquired biometric datum into a respective registration identification code of the user to be registered; then, associating such registration identification code to the user to be registered; lastly, registering the user as a registered user, and registering the associated registration identification code as the registration identification code of the registered user.

The method then comprises the phase of recognizing a registered user, among a plurality of registered users, by means of a respective recognition event. Each recognition event comprises the step of acquiring from the user to be recognized the same at least one biometric datum acquired during the registration step, correlated to a configuration of the user's blood vessels; then, the step of encoding, by means of a coding procedure (the same coding procedure used in the registration event) the at least one acquired biometric datum into a respective recognition identification code of the user to be recognized.

Moreover, each recognition event provides the steps of preparing, on the basis of the registration identification codes, registered at a plurality of registration events, a comparison set comprising a plurality of comparison identification codes; then, comparing the recognition identification code with each of the plurality of comparison identification codes; then, evaluating, for each of such comparisons, a respective matching level; lastly, recognizing or refusing recognition of the user to be recognized on the basis of the estimated matching level.

Each of the aforementioned comparisons between the recognition identification code and one of the comparison identification codes comprises processing performed by applying at least one learning algorithm.

The term "service" refers in general to a service the use of which requires registration. As already observed, the preferred field of application of the aforementioned method is the recognition of one user among many, to enable providing a POS/ATM service.

Typically—for a given service—the user registration events are numerous, one for each user, and take place at the moment in which the user registers. Such events produce a plurality of registered identification codes, one for each registered user. Such registered identification codes are stored, and form the basis on which the recognition is carried out, during a recognition event.

Considering the use of the invention as a recognition and security solution for POS/ATM terminals, the group of users exploiting such service (such as the customers of a bank) is numerically remarkable, up to an order of magnitude on the scale of millions of persons.

Thus, the plurality of registered users, among which a user is to be recognized, corresponds to the plurality of users registering to use a POS/ATM service and may potentially include millions of people. Also the number of registered identification codes may be of the same order of magnitude, and, therefore, such is the size of the set of registered identification codes to scan so as to achieve the recognition; consequently, also the number of comparisons, needed for each recognition event between the recognition identification code (i.e., the one acquired for the recognition) and the registered registration identification codes, may be very large.

The term "recognition event" is intended to indicate the event which takes place when the user, who has already registered for the use of the service, wishes to perform a POS/ATM transaction for which he/she must be previously recognized/identified.

In the light of the above, the method must have particular speed and precision properties, so as to be able to satisfy the requirements of the aforementioned applications.

Such properties are made possible by the characteristics of the method, illustrated above, in particular by the coding procedure of the biometric datum into a particular identification code and by the use of one or more learning algorithms at the moment of each comparison, as will be described in detail below.

A particular consideration may be derived from the fact that the registered identification codes do not coincide with the acquired biometric data, but depend bi-uniquely on them, through the encoding procedure. It is important to note that the method according to the invention is fully compatible with the fact that each data handling process, within the context of registration and recognition, follows criteria in themselves known, and strictly respects the requirements imposed by laws in force and by the opinions of the in-charge authorities on the matter of security and safeguarding of privacy.

According to one embodiment, the at least one biometric datum correlated to a configuration of blood vessels, which is acquired, is an image of the hand of the user to be registered or recognized. More specifically, such image can be an image of the palm of the hand.

According to a particular embodiment, each of the steps of acquiring an image of the hand of the user to be registered or recognized comprises acquiring the image of the hand by means of an infra-red sensor, configured to detect the presence of oxygen in zones corresponding to the presence of blood vessels in the hand, so as to obtain a corresponding representation of a geometry of the blood vessels of the hand.

The detection described above makes it possible to detect, from the resulting degree of opacity, the presence of oxygen in the blood. This means that the digital image acquired shows an image of the veins in the palm of the hand (in a darker colour than the background), which in turn represents a geometry of the venous configuration.

It is to be noted that the presence of oxygen in the blood is a certain indicator of life of the user, which is advantageous for a recognition method designed for the provision of a service, to prevent abuse thereof.

It is to be also observed that the geometry of the blood vessels (i.e., of the vein pattern of the palm) is an individual characterizing aspect, usually constant over time, and is therefore suitable to be a characterizing biometric datum, such as to allow recognition and identification.

Since the above considerations apply in general to blood vessels, not just to the veins of the hand, in further embodiments, also included in the invention, the biometric data refer to other parts of the user's body. The acquisition of the image of the hand is however preferable, for reasons of practicality, simplicity, and for the significantly distinctive character of the venous pattern of the hand. Consequently, such biometric datum has been chosen since it allows easy and quick image acquisition, applicable to a user of a POS or ATM without causing problems or delays, and because, on the other hand, it permits a substantially certain individual recognition.

Moreover, in order to obtain a meaningful image for the purposes of the invention, that is such as to show the vein configuration in sufficient detail to highlight individual peculiarities, even a coarse grain resolution is sufficient (generally a few bytes, such as 4 kB for instance), which is advantageous to minimize the storage resources and is coherent with applications envisaging a large number of users.

The choice of the biometric datum described above is therefore an enabling factor as regards the possibility of using the present method on a large scale.

The digital image of the hand is obtained, as output of a device used for acquisition, in the form of a multi-dimensional vector, i.e., a matrix, of bytes, each of which is indexed to indicate a spatial pixel, and contains a value relative to the shade of grey of the pixel (e.g., from 0 to 255).

According to one embodiment, the identification code is a non-exact identification code, and each of the steps of encoding the biometric datum, acquired at the moment of a registration or recognition event, comprises processing the acquired biometric datum so as to obtain, as respective identification code, a respective representation according to a specific grammatical mathematical scheme.

The notion of a non-exact code (such as a biometric datum) compared to an exact code (such as a password) has already been illustrated above.

In particular, a non-exact code is an identification code which allows a recognition procedure to operate even in the absence of a perfect identity between the biometric data of the same user acquired during the registration phase and the recognition phase.

The recognition of a non-exact code is in principle comparable to the analogical recognition of a person, which one is able to make from any of several photos, different from each other, of the same person.

The method according to the invention is able to perform recognition on the to basis of a non-exact code, such as the one deriving from a biometric datum. There are several possible reasons for which the acquired biometric data may be different, from one acquisition event to another one, e.g., a different positioning of the hand, different light conditions, a different approximation obtained from the simplified acquisition output and so forth.

Going through the details of the steps of acquisition and encoding of the image of the hand one may observe the following aspects. At each image acquisition, whether related to registration, or related to a recognition event, the acquired image is "filtered" i.e., processed, so as to capture a minimum pattern of essential recognition traits: this aspect is part of the encoding procedure.

One of the objectives of such operation is to save storage resources and reduce the verification duration time, which is a further important characteristic to enable a large scale application of the method, i.e., for a service with a large number of users.

Another objective is to improve reliability in terms of minimizing the False Rejection Ratio (FRR) and the False Acceptance Ratio (FAR).

According to one embodiment, a first aspect of the filtering comprises a processing of the image, according to conventional image processing methods, in themselves known (for example aimed at increasing the contrast between shades of grey and facilitating recognition of the venous pattern).

A second aspect of the filtering, peculiar to the invention and founded on the basis of detailed medical considerations, consists of excluding from the image peripheral or low blood pressure zones, which contribute little or nothing to the recognition, focusing rather on zones with a high presence of oxygen, recognizable by the different shade of grey, which correspond to the main blood vessels of the hand, and in particular to the intersections between such blood vessels.

A third aspect of the filtering is to rectify the identified main blood vessels, thus determining a stylized image of a few straight segments and a few intersections, like a sort of ideogram, which is the individual aspect of the venous pattern.

Such stylized image can be stored as a registration or recognition identification code, and advantageously requires limited storage space and allows a simplified comparison.

In other words, the "cloud" of data, stored as indicative of the acquired image, shows the stylization of such image, as illustrated above.

Obviously, the same type of processing is performed both on the image acquired during the registration step and on the image acquired during the authentication step, to ensure a meaningful comparison.

It is to be observed that all the processing operations of the image mentioned above consist of processing performed on the matrix representing the acquired image: actually, a transformation of the matrix is performed to obtain a vector of numbers representing the registration or recognition identification code.

Among the algorithms that can be used for the above outlined image processing, the Scale-Invariant Feature Transform (SIFT) algorithm, in itself known, can be cited.

According to a further embodiment, the encoding procedure provides processing the acquired biometric datum so as to obtain a respective representation according to a given grammatical mathematical scheme. This means that the numbers stored to represent the acquired image are not only organized in mathematical structures, but are also organised in logical structures, defined as "grammatical" by analogy with grammatical syntax.

One example of a mathematical grammatical pattern or scheme, deriving from processing of the acquired images of the hand, is as follows:

```
:patterns [
    {
        :type "line segment"
        :position
    }
    {
        :type "Y pattern"
        :position
    }
]
```

In this case, the grammar expresses a construct well formed in terms of standard basic patterns, that is to say defines a configuration of basic patterns, for example a configuration of straight lines, corresponding to the stylized image previously mentioned.

According to one embodiment of the invention, the at least one learning algorithm (that can be equivalently defined as "trained algorithm"), used for each comparison, comprises a learning meta-algorithm M-A, configured to estimate the matching level of each comparison and to determine or not the recognition of the user to be recognized, on the basis of the results generated by two or more different matching level calculation algorithms (in the example of two calculation algorithms, these will be denoted as A1 and A2).

So, in one embodiment, the overall algorithm, used for the processing of the method according to the invention, comprises a learning meta-algorithm and two or more matching level calculation algorithms.

According to a particular embodiment, such overall algorithm (considered as a whole) is a parallel and distributed algorithm: "parallel" in that the execution of the overall algorithm provides a logically simultaneous execution of several sequential algorithmic parts; "distributed" in that the processing/calculation system, by which the overall algorithm is executed, is distributed over different calculation units concurrently operating.

According to a particular embodiment, the learning meta-algorithm M-A is a parametric meta-algorithm, suitable to be represented by means of a parametric formula based on the results of a set of matching level calculation algorithms (A1, A2), wherein each of the parameters of the parametric formula is defined on the basis of a level of reliability of the respective calculation algorithm.

According to a further embodiment, the learning meta-algorithm M-A is an analytic algorithm, suitable to be represented as a finite linear combination, with real coefficients, of a set of matching level calculation algorithms, wherein each of the coefficients is defined on the basis of a level of reliability of the respective calculation algorithm.

In this description, the term meta-algorithm is taken to mean an algorithm operating on the basis of other algorithms or, in other terms, an algorithm which performs "pooling" from a set of algorithms, components of the "pool".

The meta-algorithm is not necessarily qualitatively different from the algorithms of the "pool"; moreover, the meta-algorithm can be of lesser, greater or the same complexity as the algorithms composing the "pool".

The meta-algorithm stands out from the other algorithms by its function: it has the purpose of encoding the decision rule, which is taken after listening to the opinion of all the algorithms comprised in the "pool". Therefore, the meta-algorithm collects and represents the essence of the decision rule.

The term "parametric algorithm" is adopted in the present description to mean an algorithm the behaviour of which is completely parameterized by a (finite) set of variables, defined "parameters"; typically, the variables at stake are numbers.

The term "analytic algorithm" is adopted in the present description to mean an to algorithm for performing a calculation which implements a finitely estimable formula; in particular, the case in which the formula is merely a (finite) linear combination can be highlighted.

In the present description, the term "learning meta-algorithm (or algorithm)" is used to mean that the method of functioning of the meta-algorithm (or algorithm) is updated on the basis of the produced results and of the nature of the incoming input, at least in an initial learning (or training) phase.

If the algorithm is parametric, the learning is made by a calibration of parameters which define the behaviour of the algorithm.

As regards the matching level calculation algorithms (A1, A2), these may be learning or non-learning calculation algorithms, according to diverse embodiments comprised in the invention.

According to a further embodiment, the calculation algorithms A1, A2 comprise parametric calculation algorithms.

According to a particular embodiment, the calculation algorithms A1, A2 comprise analytical calculation algorithms.

According to one embodiment of the invention, the processing performed during the comparison step of identification codes, using a learning meta-algorithm M-A, comprises the steps of calculating a first matching level between two identification codes to be compared, by means of a first matching level calculation algorithm (A1); then, calculating at least a second matching level between two identification codes to be compared, by means of a second matching level calculation algorithm (A2); lastly, combining the first calculated matching level and the second calculated matching level, each weighted by a respective weight parameter, by a learning meta-algorithm M-A, to estimate the matching level of each comparison. Each of the weight parameters is defined on the basis of a level of reliability of the respective matching level calculation algorithm.

In the following, each single comparison action between a recognition identification code, acquired during a specific recognition event, and one of the registered registration identification codes is focused on.

Such comparison provides firstly an evaluation of the "similarity" (or "matching"), to quantify a "matching probability", i.e., the aforementioned "matching level"; then, a comparison between the obtained matching level and a pre-set matching (i.e., recognition) threshold.

In general terms, the similarity/matching evaluation can be performed by means to of one or more learning algorithms, each of which characterized by adjustable parameters which are set through a learning phase, and which can be progressively refined. The application of such algorithms implies continuous learning and improvement in the reliability of the obtained results.

More specifically, it should be noted that a very important aspect of the invention consists of achieving a high level of reliability (thus, probability of success) of the recognition, which entails achieving the maximum reliability possible in each single comparison or pattern-matching process between a recognition identification code and a registration identification code.

This requires to minimize the False Rejection and False Acceptance events.

It is to be noted that, for use in payment systems, the occurrence of False Acceptance is particularly disadvantageous, and therefore must be minimized (minimization of the FAR parameter).

Such requisite is not satisfied by using of single analytical algorithms.

On the other hand, the need to perform the single comparison process very quickly, consistently with the considered applications, is pressing. Such requisite imposes limits to the complexity of the single matching level calculation algorithm: in fact, generally speaking, the greater is the reliability of a single algorithm, the more complex and slower is to produce a result.

The method according to the invention is therefore based on the synergy of a plurality (at least two) algorithms A1, A2, synergy made possible thanks to the use of the meta-algorithm M-A, which is trained or is pre-trained in a supervised manner. The result of the calculation algorithms A1, A2 is filtered by the meta-algorithm M-A, which employs meta-heuristic concepts to interpret the results of the single calculation algorithms.

For example, as already noted, the calculation algorithms A1, A2 can be analytical algorithms, therefore quick and relatively simple algorithms, since based on a deterministic comparison of an analytic calculation result and a threshold. Just for this reason, each calculation algorithm, in itself, is often not sufficiently reliable.

The use of the meta-algorithm M-A on intermediate results, generated by the calculation algorithms A1, A2, allows an improvement in the reliability of the overall result, at the same time remaining much faster than a possible application of learning techniques directly on the single images/codes to be compared.

In other words, the method of the present invention entails the synergy of a "local" level (matching level calculation algorithms or "local algorithms" A1, A2) and a "global" level (the learning "global" algorithm or meta-algorithm M-A, which interprets the results of the "local" algorithms).

In one embodiment, the results of each local algorithm A1, A2 (e.g., the first and second matching level estimation), once obtained, can be combined by means of a predefined function, characteristic of the global meta-algorithm M-A, to produce the overall matching evaluation, and thereby determine recognition or not.

Such predefined function can for example be a combination depending on weighted parameters. According to a typical embodiment, such function is a sum of weighted results, according to the formula [1] given below:

$$R = \sum_{i=1}^{N} \lambda i * Ai$$

in which R is the overall probabilistic matching estimation (R is compared with a threshold T to determine recognition); $A_i$ is the probabilistic estimation resulting from the i-$^{nth}$ local algorithm; $\lambda_i$ is the weight parameter associated to the i-$^{nth}$ local algorithm (representing the reliability of the results offered by such algorithm).

The method, according to one embodiment of the invention, further provides, before use for registration or recognition events, a supervised learning phase of the meta-algorithm M-A, which comprises the steps of: training the meta-algorithm M-A in a supervised manner, on the basis of a series of learning comparisons of acquired identification codes and already registered identification codes belonging to users having a known identity; then, determining the level of reliability of the matching level calculation algorithms (A1, A2) on the basis of the results of the learning comparisons; lastly, defining the parameters (that is the weight parameters, or meta-algorithm coefficients) on the basis of the determined levels of reliability, to obtain a desired overall probability of success of the recognition determined by the meta-algorithm M-A.

Thus, the supervised learning phase of the meta-algorithm is in this case an initial learning phase of the system of weight parameters or linear combination coefficients, being the learning aimed at regulating the responses of the meta-algorithm, so as to achieve the best level possible of accuracy and minimization of the FAR (False Acceptance Ratio) parameter of said meta-algorithm, at the initial time.

Such learning phase can consist of a calibration procedure of the parameters.

Returning to the above formula [1], it can be noted that the parameters $\lambda_i$ are to determined in the initial phase of learning.

In the case in which the calculation parameters A1, A2 are parametric algorithms too, the initial phase comprises first of all a calibration of the parameters of the single algorithm (A1/A2), to obtain the best possible starting reliability; such initial calibration, which can also comprise a fine tuning, depends on the particular single algorithm (in itself known) and is therefore in itself known.

The initial phase then provides the use of the single calculation algorithm, once "tuned", for the comparison between the acquired code and the registered code of each of a plurality of test users, whose identity is known a priori, so as to characterize the calculation algorithm, that is to say, to determine its False Error Ratio quality coefficients (in particular the False Acceptance Ratio FAR).

Lastly, the initial phase provides determining the weight parameters depending on the quality coefficients of each algorithm; the preferred adopted criterion is that the weight parameter is higher the higher is the quality coefficient of the calculation algorithm, or the lower is the respective FAR parameter. It should be noted that the determination of the weights is not deterministic, but is performed on the basis of supervised learning techniques, taking into account the overall result produced by the meta-algorithm.

It is to be noted that the proposed method benefits from ample margins of flexibility and degrees of freedom, which may be adapted to diverse specific projects.

The number of used calculation algorithms can vary, in different embodiments of the invention.

Even the type of used algorithm can vary, and algorithms in themselves known can be chosen in the most opportune manner and fitted to the method according to the invention.

Typically, both the learning meta-algorithm M-A and the matching level calculation algorithms A1, A2 belong to a set comprising the following algorithms or of algorithm families: Support Vector Machines, Restricted Boltzmann Machines, pattern mining algorithms, Bayesian algorithms, Markov models, neural networks, boosting techniques, evolutive algorithms, algorithms using Locally Weighted Linear Regression, collaborative filtering algorithms, algorithms using space dimension reduction techniques.

Preferably, the learning meta-algorithm is of the Support Vector Machine or Restricted Boltzmann Machine type.

Preferably, the two or more matching level calculation algorithms are different from each other, each being one of the algorithms of a set comprising: pattern mining algorithms, Bayesian algorithms, Markov models, neural networks, boosting techniques, evolutive algorithms, algorithms using Locally Weighted Linear Regression, collaborative filtering algorithms, algorithms using space dimension reduction techniques (such as Principal/Independent Components Analysis, or Singular Value Decomposition).

In the particular case in which the calculation algorithms A1, A2 are analytical, they can for example be (but not limited thereto): algorithms based on geometric parameters and "scoring" functions; algorithms based on representation by means of equations of the surface of the hand and analytical detection of characteristic points on the surface of the hand; Scale Invariant Feature Transformation SITF type algorithms (as in the aforementioned patent application US 2012/0057763); algorithms based on Gabor filters (such as the Kong algorithm in the patent application US 2010/0045788).

According to a further embodiment, the method of registration and recognition according to the invention further comprises the step of training the meta-algorithm M-A further, while said meta-algorithm is being used during one or more recognition events.

Such further learning is performed on the basis of the comparison results obtained during one or more recognition events, and implies an adjustment of the aforementioned parameters or weight parameters or coefficients associated to the matching level calculation algorithms.

The comparison results may comprise a matching level determined by the meta-algorithm and one or more matching calculations resulting from the matching level calculation algorithms.

In one embodiment, such further learning of the meta-algorithm M-A is performed in a non-supervised manner.

In another particular embodiment, such further learning of the meta-algorithm M-A is performed in a non-supervised manner applying feedback, that is to say taking into account the results obtained by the different calculation algorithms A1, A2, and increasing the weight of the more reliable algorithm for the formation of the meta-algorithm's opinion.

Thus, the further learning phase is a phase of continuous revision of the way in which the algorithms are combined (revision of the set of weight parameters or set of coefficients), which regulates the responses of the meta-algorithm, while the meta-algorithm M-A is used during the recognition service, in order to optimize the accuracy and minimize the "False Acceptance" error of said meta-algorithm.

It is to be noted that the use of continuous learning "on the field", during real recognition events, contributes to further and continuously improve the recognition reliability. This is coherent with the general logic of exploiting the information progressively acquired to refine more and more the method, in line with the concepts typical of learning algorithms, based on learning.

The aforementioned learning and related non-supervised training of the meta-algorithm during its use will now be considered in more detail.

A first method of non-supervised training consists of monitoring the cases in which a recognition threshold, pre-set for the decision (for example over 95%, or over 99%) is not reached. In such case, aiming at recognizing the user in any case, historic images which appear the most similar, among those available (acquired not during the registration phase, but during previous recognition events of users presented for recognition), are considered in order to possibly overcome the recognition threshold.

This constitutes a form of "assistance" to the formation of the opinion by the meta-algorithm.

In such cases, if recognition is finally achieved, the results provided by each calculation algorithm A1, A2 can be considered, advantageously, and further information is thus available to estimate the reliability of each algorithm. Such further information may in part be different, and thus correct and refine the information available at the moment of the first supervised training.

This may lead to a variation of the weight parameters, obviously in such a way to favour the algorithms which turn out to be, in relative terms, more reliable than expected.

The updating of the weight parameters may be conducted at a variable frequency, for example at predefined time intervals of varying duration.

The updating intervals are calculated by means of an exponential damper formula which allows the determination of the alpha time lag parameter during the calibration of the model.

A further possible method to estimate the reliability of the single algorithms (with a view to a continuous and evolutive refining of the weight parameters) consists of considering and comparing the probability of recognition, or non-recognition, of each "local" algorithm A1, A2 in the cases in which the meta-algorithm M-A has attained a recognition.

Typically, in a preferred embodiment, an assessment criterion of the single local algorithms provides minimizing false acceptances (FAR).

It has already been observed that each registration event according to the present method comprises a phase of preparing a comparison set including a plurality of comparison identification codes. Such phase comprises the steps of defining the comparison set starting from the whole set of all the registration identification codes of the plurality of users already registered, and using, on such whole set, classification and grouping techniques on the registration identification codes.

According to a particular embodiment, the method described above further comprises the phases of classifying each registered registration identification code, on the basis of one or more classification variables; and grouping the registered registration identification codes into sets of comparison identification codes, on the basis of the classification that has been carried out.

In the case in which the registered identification codes are stored in a data-base, the data-base is scanned with a scanning order based on the grouping, and the comparison is made according to said scanning order.

For example, the comparisons are performed only or primarily on the set of identification codes arranged according to the above criteria.

For the grouping, clustering techniques, both supervised and non-supervised, can be used, taking into account different possible forms of groupings or "clusters" (such as overlapping, or fuzzy or random clusters and so forth) and different classification possibilities (such as supervised clustering in separated clusters), in order to speed up the whole recognition process as much as possible.

Various clustering algorithms can be used in different embodiments of the invention, among which, for example (but not limited thereto) "canopy", "k-means", "fuzzy", "expectation maximization", "Mean Shift", "hierarchical", "Dirichlet process", "Spectral", "top-down" algorithms.

The aforesaid classification variables may belong to a set comprising: geometrical variables deriving from transformation of non-exact identification codes according to a mathematical grammatical scheme; inter-dependencies between identification codes and physical locations of terminals arranged to perform recognition (for example, correlations between the site/location of the recognition event site and the site/location of the registration event).

According to a particular embodiment, the grouping operation further comprises the step of indexing the registered identification codes on the basis of one or more classification variables.

It has already been observed that the recognition functions carried out by the present method go well beyond the mere identity verification function, and imply much more challenging requirements. In fact they do not merely require a comparison between a single acquired identification code and a single registered identification code, but require instead a comparison between the acquired identification code and each of a plurality of registered identification codes (for example stored in a data-base).

Therefore, a very important aspect for making the method performances suited to the considered application field is to speed up not only the single comparison, as previously illustrated, but also the plurality of comparisons to be performed, the number of which may be to the order of magnitude of the data-base of registered customers, that is to say up to hundreds of thousands or even millions of users.

According to one embodiment of the invention, that can be implemented independently of the embodiments described above, the method provides optimized data-base navigation modes (primarily in terms of search speed), which are based on "smart" scanning of said data-base as opposed to a purely sequential scanning of the entire data-base. This implies that priority criteria are defined, indicating which parts of the data-base shall be scanned firstly, since the corresponding registered identification code possibly leading to recognition is expected to be found most probably therein.

This aspect entails in turn a clustering of the data-base, that is to say a suitable grouping of the standard identification codes registered in the database. Thanks to such clustering, the navigation, performed by "smart" scanning of the data-base with a scanning order based on the clustering, can be optimized and speeded up, starting from the sets of registered identification codes, the variables of which are most relevant to those of the current recognition event.

It is to be observed that such navigation through the data-base can be realized (once the data-base has been organized as indicated above) by data-base search engines in themselves known.

It is to be also noted that, in one embodiment of the invention, the data-base scanning features, as illustrated above, are provided in cases in which learning algorithms are not used.

As already observed several times, the method of registration and recognition according to the invention is typically associated to an operating service and acts differently depending on requirements imposed by the operating service itself.

According to one embodiment of the method, it further comprises the steps of pre-defining one or more operating parameters associated to respective operations available from the operating service; then, requesting of one of such operations by the user of the service, before the recognition is completed; then, using the operating parameters associated to the operation requested by the user, both for the recognition event and for providing the operating service to the user.

In fact, for each service, a set of operating parameters is defined, e.g., parameters for managing the scheduling of the requested operating service (for example, deferred execution), or parameters such as quality thresholds to manage the trade-off between speed and accuracy in the recognition service, each threshold being correlated to the type of operation requested by the user.

According to one embodiment of the invention, the phase of recognizing or refusing to recognise the user comprises verifying whether and when the matching level obtained between a recognition identification code and one of the identification codes of the comparison set is above a matching threshold.

According to a particular embodiment, a plurality of recognition thresholds is defined, each correlated to a respective operation available from the operating service. In such case, the method further comprises the steps of requesting one of the possible operations by the user of the service, before recognition is completed; then, automatically selecting the matching threshold correlated to the operation requested by the user; lastly, performing the step of recognizing the user using such selected threshold as the matching threshold.

The determination of the matching threshold, that is to say the level of probability of recognition beyond which recognition is determined, is an important degree of freedom with a view to minimising "False Acceptance", even at the cost of slightly worsening "False Rejection". In fact, it should be noted that the setting of the recognition threshold is an important step: the threshold must first of all be high enough to allow a minimization of "False Acceptance" occurrences (at truly minimal values, given the type of application), but it must allow sufficiently quick processing, on the other hand.

Obviously, the higher the threshold is, the higher is the recognition requisite and the lower is the FAR (False Acceptance Ratio), but impairing the FRR (False Rejection Ratio). With the purpose of finding an optimal trade-off, the definition of a fixed, unchangeable threshold is a disadvantageous obstacle and rigidity factor.

Consequently, according to one embodiment of the invention, that can be implemented independently of the embodiments described above, the method provides a controllable setting of the recognition threshold, depending on the parameters specific to the given operation associated to a given recognition event. In particular, the setting of the recognition threshold can be controlled automatically depending on "business" parameters (e.g. money amount requested). In fact, while for non-critical operations (for example transactions involving a small money amount) a slightly higher risk of FAR may be accepted, to obtain the benefit of a lower FRR (which contributes to avoid annoying the user, as would happen in the case of an excessively high FRR).

Conversely, for more critical operations, such as transactions involving larger money amounts, the risk, and thus the FAR, must be minimized, even at the cost of a higher FRR.

In brief, the matching (i.e., recognition) threshold can be set so as to be higher the more critical the consequences of a possible "False Acceptance" are.

Since the recognition threshold defines the maximum error considered acceptable (e.g., in terms of FAR), it can be fixed at whichever level, depending on the needs as above described.

It is to be noted lastly that, in one embodiment of the invention, the features of controlling the setting of the recognition threshold, illustrated above, are also provided in cases in which predictive learning algorithms are not used.

According to a further embodiment of the method, the step of preparing a set of comparison identification codes further comprises the step of performing processing on a set of identification codes stored for the same registered user, available at the moment of recognition.

Typically, such set of identification codes stored for the same user comprise recognition identification codes stored at different recognition events.

According to respective embodiments, the set of identification codes stored for the same user are reduced to the identification code acquired at the moment of registration; or, reduced to the identification codes acquired most recently; or reduced to the most recently acquired identification code.

According to a particular embodiment, the method comprises the further steps of providing recognition identification codes, stored at the moment of different recognition events, to a further learning algorithm, together with the corresponding registration identification code of the recognized user; then, obtaining a new registration identification code for the user, by means of the further learning algorithm, on the basis of the registered registration identification code for the user and of the stored recognition identification codes; then, registering the new registration identification code as the registration identification code of the user, to take into consideration an evolution of the individual venous pattern of said user, or to improve the matching between the venous geometry and its representation as an identification code.

The characteristic illustrated above, referring to a particular embodiment of the invention, allows a further improvement of the recognition capabilities, ensuring an evolution of a user identification code over time, taking advantage of the additional information that can be acquired while increasing the number of recognition events.

This is achieved by considering each recognition event as an opportunity for improving the registered biometric identification code, thereby determining a progressive evolution of the recognition datum, at each recognition event.

Such solution has a twofold advantage: it allows a progressive improvement in terms of reliability of recognition, and in addition it permits an adjustment with respect to any possible organic variations over the course of time (due to growing or ageing, or even to traumatic events).

The aforementioned characteristic implies, once again, the use of a learning algorithm, more specifically, of a further learning algorithm. Learning algorithms such as those previously cited for the comparison phase can be used for such purpose.

According to one embodiment of the method, in the case in which an image of the hand is acquired as the biometric datum, the step of encoding the registration or recognition image comprises geometric transformation and/or filtering operations on the acquired image, performed on the basis of an analysis of the image contents.

Such embodiment is developed starting from the observation that the reliability of recognition may depend in a critical manner on the correspondence between the positioning of the hand during the registration event and the positioning of the hand during the recognition event. In other words, the spatial coordinates of the "registration reference system" must ideally be equal to the spatial coordinates of the "acquisition reference system". A positioning even slightly out of phase may be one of the main causes of recognition error.

In the light of this, the phase of encoding the image may further comprise the phase of defining a reference spatial coordinates system; then, detecting an acquisition spatial coordinates system, depending on the positioning of the hand at a specific registration and/or recognition event; then, identifying a coordinate transformation needed to pass from the reference spatial coordinates system to the acquisition spatial coordinates system; lastly, performing matrix roto-translation processing on the acquired image to obtain an equivalent acquired image, referred to the reference spatial coordinates system.

In this way, at each acquisition event, the differences between the optimal/ideal positioning of the hand and the actual position (potentially, even inclined) are recognized.

According to a particular embodiment, the reference system and the system of coordinates in relation to which registration, and thereby the processing of the image, took place consists of representing the image acquired during the recognition event in relation to the same reference system as the registration event.

In addition to the above, in another embodiment, the method performs auxiliary processing of the image to obviate non-uniformities of other types between the moments of registration and recognition, for example in terms of different luminosity.

The method according to the invention, described above, can be used not only for recognition but also, possibly, to perform functions introductory or preparatory to the provision of a service.

To such purpose, in a particular embodiment, the method comprises, after the step of recognizing or refusing recognition of a user, the further phase of supplying a service providing apparatus with an indication of recognition or non-recognition of the user; moreover, only if the user has been recognized as one of the registered users, the method provides supplying the service providing apparatus with an indication of the identity of the recognized user.

A method of providing a service, comprised in the invention, will now be described. Such method provides that the service is supplied only after an indication of recognition of the user.

Moreover, the mode by which the service is provided depends on an indication of the identity of the recognized user, wherein the recognition of the user is performed by means of a method of registration and recognition according to the aforementioned description.

According to preferred embodiments of the invention, the aforementioned method of providing a service relates to the provision of a POS service or an ATM service.

In such context, the method according to the invention can be used within the general framework of banking procedures, as a substitute solution of recognition by means of a PIN. In fact, such method permits the use of POS or ATM services even without the use of credit cards and/or without entering code numbers such as PINs or passwords.

This means that the procedures downstream of recognition, related for example to operations entailing the transfer of money, remain the standard procedures already used in the banking context. This aspect is a clear advantage of the proposed method and makes it practically applicable.

For the use of certain services, the registration phase may be associated with an initial certification of the identity of the person being registered, of the type normally in use at a bank branch office. Consequently, in this case, the registration phase typically takes place under the direct control of bank staff, for example inside the bank office.

Alternatively, different registration modes are possible, for example based on recognition of a credit card, methods possible even out of the bank office, but at specialized points (for example, in airports).

Figure 1:
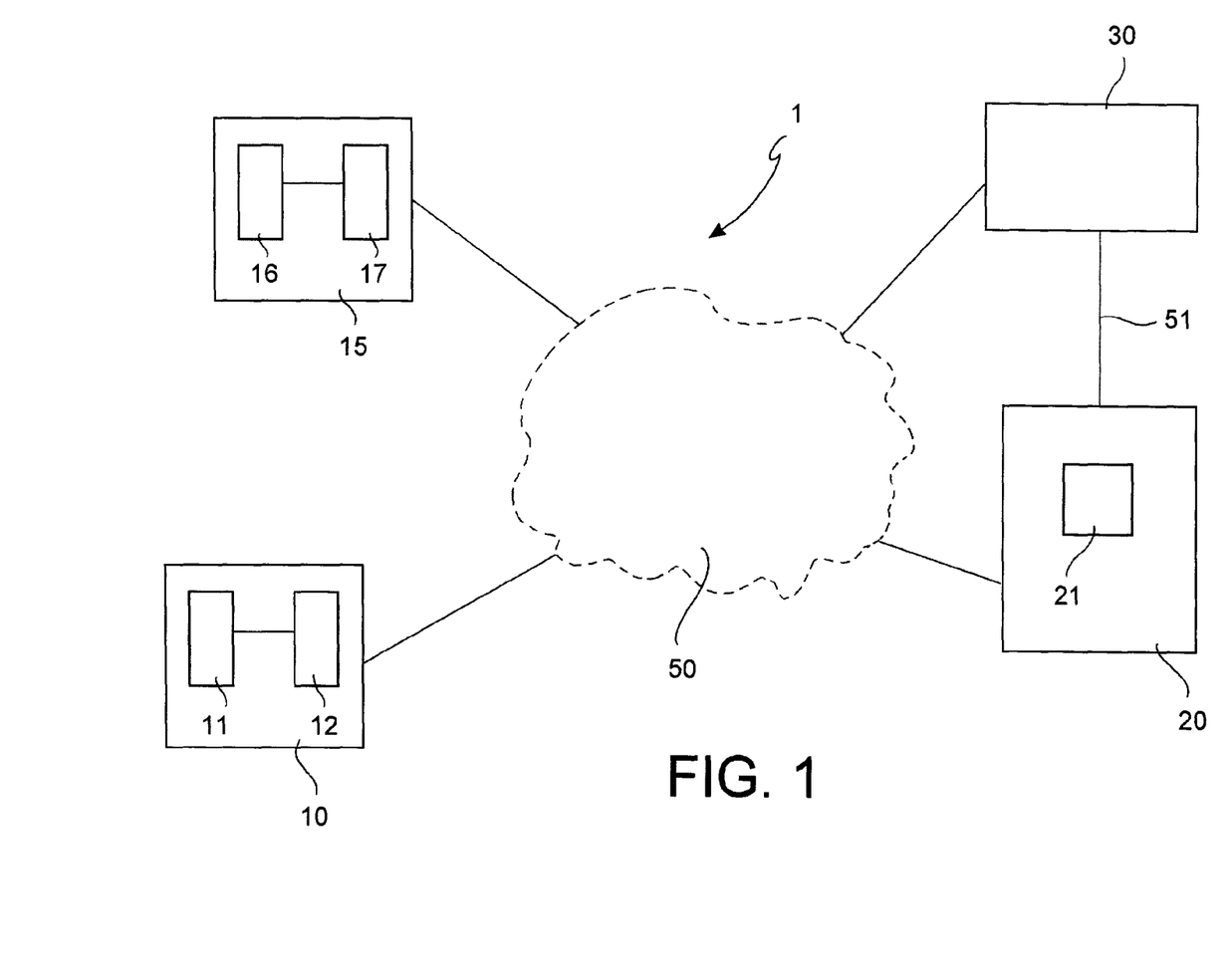
FIG. 1 shows a simplified functional diagram of a system for recognition of a user according to the present invention.

With reference to FIG. 1, a system 1 for quick recognition of a user of a service, by means of identification codes derivable from biometric data, is now described. Such system 1 comprises at least one recognition terminal 10, data storage means 30 and a recognition apparatus (server) 20.

Each of the recognition terminals 10 comprises biometric data acquisition means 11, configured to acquire at least one biometric datum correlated to a configuration of the user's blood vessels.

Each of the recognition terminals 10 further comprises first terminal processing means 12, operatively connected to the biometric data acquisition means 11, to receive the at least one acquired biometric datum, and configured to encode the at least one acquired biometric datum into a recognition identification code of the user, at a recognition event of the user.

The data storage means 30 are configured to store a plurality of registered registration identification codes.

The recognition apparatus 20 is operatively connected to the recognition terminal 10, to receive the recognition identification code generated by the terminal, and in addition operatively connected to the data storage means 30 to access the registered registration identification codes.

The recognition apparatus 20 comprises recognition processing means 21, configured to perform at least one of the following operations: preparing, on the basis of the registered registration identification codes, a comparison set comprising a plurality of comparison identification codes; then, comparing the recognition identification code with each code of the plurality of comparison identification codes; consequently estimating, for each comparison, a respective matching level, by means of processing performed applying at least one learning algorithm; lastly, recognizing or refusing recognition of the user to be recognized, on the basis of the estimated matching levels.

According to one embodiment, the recognition processing means 21 are configured to perform the overall algorithm related to the processing based on by logically simultaneous execution of several sequential algorithmic parts.

According to another embodiment, complementary or alternative to the previous one, the recognition processing means 21 are made by different calculation units, configured to operate concurrently in a distributed calculation context (in which the overall algorithm is a distributed algorithm).

According to a particular embodiment, the system 1 further comprises at least one registration terminal 15.

The registration terminal 15, in turn, comprises further biometric data acquisition means 16, configured to acquire at least one biometric datum correlated to a configuration of the user's blood vessels; and in addition, second terminal processing means 17, operatively connected to the further biometric data acquisition means 16, to receive the at least one acquired biometric datum. Such second processing means 17 are configured to encode the at least one acquired biometric datum into a registration identification code of the user, at a registration event of the user.

In this embodiment, the data storage means 30 are, in addition, operatively connected to the registration terminal 15, to receive the registration identification code generated thereby, at the registration event.

According to one embodiment, the registration terminal 15 and the recognition terminal 10 have substantially the same structure and functions.

According to a further embodiment, the registration terminal 15, configured to perform registration events, and the recognition terminal 10, configured to perform recognition events, are comprised in a single acquisition and encoding device, comprising acquisition and encoding means configured to operate as first terminal processing means 11 and as second registration terminal processing means 16.

According to one embodiment of the recognition system, the recognition apparatus 20 is a server 20, located for example at a data centre of the institution (bank) which provides the service, and remotely connected to the recognition terminal 10 or to the registration terminal 15 or to the acquisition and encoding device, by means of a telecommunications network 50.

With reference to the aforementioned operative connections between the components of the system, it should be noted that the operative connection between the recognition terminal 10 and the recognition server 20 can be realized by means of any telecommunications network 50 in itself known (preferably, a telecommunications network of the institution providing the service, such as the VPN of a bank).

Similarly, the operative connection between the registration terminal 15 and the recognition server 20 can be realized by means of the telecommunications network 50 or another similar telecommunications network.

The operative connection 51 between the recognition server 20 and the data storage means 30 can be realized by means of a telecommunications network. Preferably, the data storage means 30 are co-located with the recognition server 20 in the data centre of the bank, and the telecommunications network which connects them is a local network (LAN) 51 present in such centre.

In order to support the above mentioned connections, the system components (recognition terminal 10, registration terminal 15, recognition server 20 and data storage means 30, if not included in the server 20) are provided with respective communication interfaces, in themselves known, to the telecommunications network/s.

According to a further particular embodiment, not shown in the FIG. 1, the recognition system further comprises a signalling device, operatively connected to the recognition apparatus to receive an indication of recognition or non-recognition, and configured to signal such indication of recognition or non-recognition.

In a particular embodiment, the recognition signalling device is comprised in the aforementioned acquisition and encoding device.

According to one embodiment of the system, the biometric data acquisition means 11 comprise means for acquiring a user's hand image in the band of the infra-red and near infra-red spectrum, such means comprising at least one infra-red sensor (in particular, operating in the infra-red and near infra-red spectrum band), configured to detect the presence of oxygen in zones corresponding to the presence of blood vessels in the hand, so as to obtain a corresponding representation of a geometry of the blood vessels of the hand. The infra-red sensor is able to generate a digital representation of the acquired image, and of the related geometry, and to provide in output such digital representation to the first processing means 12, to be processed as described above. In one embodiment, the output provided by the infra-red sensor is a digital image, in the form of a two-dimensional or multi-dimensional vector of bytes, each of which indexed to indicate a spatial pixel and containing a value related to the shade of grey of the pixel (value comprised for example in the range of 0-255).

The aforementioned means for acquiring a user's hand image are in themselves known (for example, making reference to the prior art, cited above in the corresponding section).

The aforementioned first and second terminal processing means 12, 17 and the recognition processing means 21 are realized by means of processors or calculators or computers, in themselves known.

The data storage means 30 are realized for example by means of computers or workstations provided with memories, in themselves known. In diverse embodiments of the system, these can comprise one or more data storage supports for the identification registered codes. In the case of several data storage supports, these may be centralized or distributed.

According to different embodiments, the data storage means are incorporated in the server 20, or co-located in the same data centre which the server 20 is located in, or not co-located and accessible remotely.

According to one embodiment, the data storage means 30 comprise a data-base for registration of the registered identification codes.

The recognition system 1 according to the present invention, in all the embodiments described above, is configured to carry out a method of registration and recognition according to any of the method embodiments illustrated above.

In particular, the aforementioned first and second terminal processing means 12, 17 and the recognition processing means 21 are configured to carry out a method of registration and recognition according to any of the method embodiments illustrated above.

Figure 2:
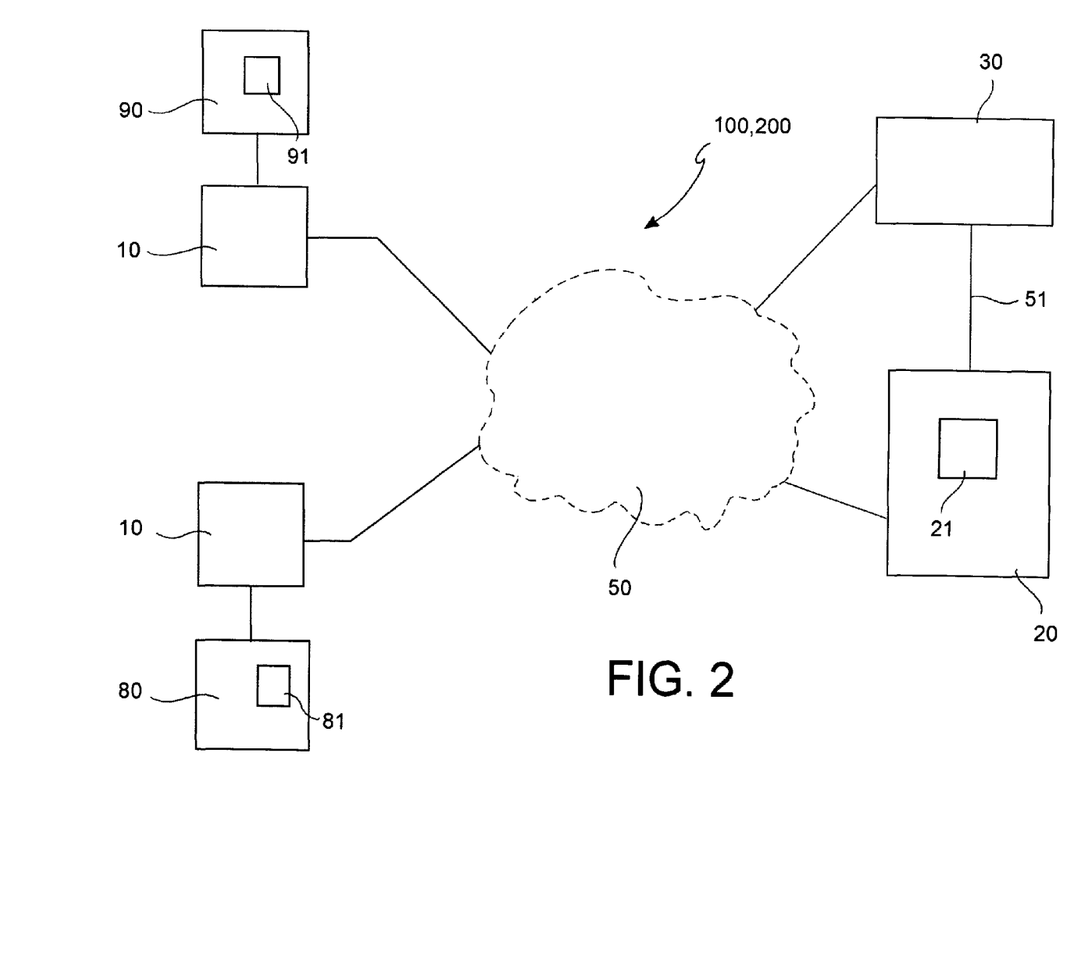
FIG. 2 shows a simplified functional diagram of systems for providing POS services and for providing ATM services, comprised in the invention, which use the system in FIG. 1.

A POS (Point Of Sale) system, comprised in the invention, for providing POS (Point Of Sale) services conditional to the recognition of a registered user, is now described, The POS system 100 comprises a POS device 80, in itself known, comprising POS processing means 81 configured to provide a POS service, and in addition a system 1 for quick recognition of a user, according to the embodiments described above.

In the recognition system comprised in the POS system, the recognition processing means 21 are further configured to send the recognition terminal 10 an indication of recognition or non-recognition of the user.

The recognition terminal 10 is co-located with and operatively connected to the POS device 80 to transmit to the POS processing means 81 of the POS device 80 such indication of recognition or non-recognition.

Moreover, the POS processing means 81 are configured to provide the service only if they have received the aforementioned indication of recognition.

An ATM system (Automatic Teller Machine), comprised in the invention, for providing of ATM (Automatic Teller Machine) services conditional to the recognition of a registered user, is now described. The term ATM is used to indicate also the synonymous term "Cashpoint".

The ATM system 200 comprises an ATM device 90, in itself known, comprising ATM processing means 91 configured to provide an ATM service, and in addition a system 1 for quick recognition of a user, according to the embodiments described above.

In the recognition system comprised in the ATM system, the recognition processing means 21 are further configured to send the recognition terminal 10 an indication of recognition or non-recognition of the user.

The recognition terminal 10 is co-located and operatively connected to the ATM device 90 to transmit to the ATM processing means 91 of the ATM device 90 such indication of recognition or non-recognition.

Moreover, the ATM processing means 91 are configured to provide the service only if they have received the aforementioned indication of recognition.

In FIG. 2, an example is shown comprising both a POS system 100 (comprising a POS device 80 situated for example in a store, client of the bank) and an ATM/cashpoint system 200 (comprising an ATM device 90 situated for example at a branch of the bank) connected to the same recognition system (the one of the mentioned bank).

Obviously, the invention also comprises the cases in which the two systems (POS system 100 and ATM system 200) are independent of each other, and are connected to two different recognition systems (each one according to the invention).

As can be observed, the scope of the present invention is achieved by the method and by the systems and methods described above.

In fact, on the basis of the above, it comes out clearly that the method according to the invention is able, on the basis of an easy and fast biometric data acquisition process, to carry out a quick and reliable recognition of user of a service from among many registered users, by virtue of its specific features.

In particular, the encoding process of the biometric datum allows to decouple the biometric datum in itself from the identification code derived therefrom (while obviously maintaining a bi-unique relation). This permits on the one hand the acquisition of a meaningful biometric datum by means of a user-friendly procedure, and on the other hand, the generation of an identification code optimized in terms of data storage (requiring limited storage resources) and handling. In particular, the identification code is optimized with respect to the possibility of making meaningful and fast comparisons between acquired codes and registered codes, in the context of a registration event.

Moreover, the use of at least one learning algorithm (in the manner described in detail above) allows to remarkably speeding up the aforementioned comparisons, while maintaining a high degree of recognition reliability, as required by the considered services. In fact, the use of learning algorithms (as opposed to purely analytical non-learning algorithms, as in the solutions of the prior art) enables a scalability in the application of the method, up to extremely numerous groups of registered users, and ensures with the due extreme care the correctness of functioning of the method. In fact, given its application in payment systems and/or money transfers, the method cannot sacrifice reliability (risk of "false acceptance") in order to improve efficiency and speed. The use of learning algorithms thereby enables the method to "learn better", assuring a quick recognition service which keeps the level of false acceptance at a minimum.

Consequently, the characteristics of the method, in terms of speed and reliability, achievable thanks to the aforementioned characteristics, make it applicable to the recognition of a user from hundreds of thousands, or even millions, with a degree of recognition reliability acceptable even for POS and/or ATM services.

Moreover, the use of learning meta-algorithms in a dynamic and continuous manner helps to further improve the performance of the method.

In the same way, the possibility of dynamically adjusting the recognition thresholds, depending on the type of operation requested by the user, within the context of a given service, improves the flexibility of the method, so as to optimize it for different types of operations and services.

Even more, the possibility of dynamically refining the registered identification code of a given user, by exploiting different and subsequent recognition events so as to also improve the registered datum, improves the reliability of recognition achievable by the method.

In addition, the characteristics related to the classification and grouping of the registered codes, and the search methods within the set of registered codes, further improve, in a significant manner, the performance of the method in terms of speed of recognition.

Similar considerations apply with reference to the method of providing services, as well as to the recognition system, the POS system and the ATM system, comprised in the invention.

A person skilled in the art may make modifications and adaptations to the embodiments of the method of registration and recognition, to the method of providing a service, to the system for recognition of a user of the service, and to the apparatuses for providing ATM/POS services according to the invention, described above, replacing elements with others functionally equivalent, also in conjunction with the prior art, to create hybrid implementations so as to satisfy contingent requirements, while remaining within the scope of protection of the following claims. Each of the characteristics described as belonging to a possible embodiment may be realized independently of the other embodiments described.

It is to be noted moreover that the term "comprising" does not exclude other elements or phases, the term "one" or "a" not excluding a plurality. In addition, the figures are not necessarily in scale; on the contrary importance is generally given to illustrating the principles of the invention.

The invention claimed is:

1. Method of registration and recognition of a user of a service, by identification codes derivable from biometric data, comprising the steps of:

a. registering a user, by a respective registration event, wherein each registration event comprises:
   acquiring from the user to be registered at least one biometric datum correlated to a configuration of the user's blood vessels;
   encoding, by a coding procedure, the at least one acquired biometric datum into a respective registration identification code of the user to be registered;
   associating said registration identification code to the user to be registered;
   registering the user as a registered user, and the associated registration identification code as the registration identification code of the registered user;
b. recognizing a registered user, among a plurality of registered users, by a respective recognition event, comprising:
   acquiring from the user to be recognized said at least one biometric datum correlated to a configuration of the user's blood vessels;
   encoding, by said coding procedure, the at least one acquired biometric datum into a respective recognition identification code of the user to be recognized;
   preparing, on the basis of the registration identification codes, registered at a plurality of registration events, a comparison set comprising a plurality of comparison identification codes;
   comparing the recognition identification code with each of the plurality of comparison identification codes;
   estimating, for each of said comparisons, a respective matching level;
   recognizing or refusing recognition of the user to be recognised on the basis of the estimated matching levels;
   wherein said steps of acquiring comprise acquiring a digital image of a hand of the user by a digital acquisition device; and
   wherein each of said comparisons between the recognition identification code and one of the comparison identification codes comprises processing performed by applying at least one learning algorithm,
   wherein said at least one learning algorithm comprises a learning meta-algorithm configured to estimate the matching level of each comparison and to determine or not the recognition of the user to be recognized, on the basis of results generated by two or more different matching level calculation algorithms.

2. Method according to claim 1, wherein the at least one biometric datum correlated to a configuration of blood vessels is an image of the hand of the user to be registered or recognized.

3. Method according to claim 2, wherein each of the steps of acquiring an image of the hand of the user by a digital acquisition device comprises acquiring the image of the hand by an infra-red sensor, configured to detect presence of oxygen in zones corresponding to presence of blood vessels in the hand, so as to obtain a corresponding representation of a geometry of the blood vessels of the hand.

4. Method according to claim 2, wherein the step of encoding the registration or recognition image comprises geometric transformation and/or filtering operations on the acquired image, performed on the basis of an analysis of the image contents.

5. Method according to claim 1, wherein the identification code is a non-exact identification code, and wherein each of the steps of encoding the acquired biometric datum, at a registration or recognition event, comprises processing the acquired biometric datum so as to obtain, as a respective identification code, a respective representation according to a specific grammatical mathematical scheme.

6. Method according to claim 1, wherein the processing for comparing a recognition identification code and one of the comparison identification codes is carried out by an overall algorithm, comprising said meta-algorithm and said calculation algorithms.

7. Method according to claim 6, wherein said overall algorithm is a parallel and distributed algorithm.

8. Method according to claim 1, wherein said learning meta-algorithm is a parametric meta-algorithm, suitable to be represented by a parametric formula based on results of a set of matching level calculation algorithms, wherein each parameter of a parametric formula is defined on the basis of a level of reliability of a respective calculation algorithm.

9. Method according to claim 8, wherein the learning meta-algorithm is an analytical algorithm, suitable to be represented as a finite linear combination, with real coefficients, of a set of matching level calculation algorithms, wherein each of the coefficients is defined on the basis of a level of reliability of the respective calculation algorithm.

10. Method according to claim 8, further comprising, before use for user registration or recognition events, a supervised learning phase of said meta-algorithm comprising:
   training the meta-algorithm in a supervised manner, on the basis of a series of learning comparisons between acquired identification codes and already registered identification codes belonging to users having a known identity;
   determining the level of reliability of the matching level calculation algorithms on the basis of the results of said learning comparisons;
   defining the parameters or weight parameters or meta-algorithm coefficients on the basis of the determined levels of reliability, to obtain a desired overall probability of success of the recognition determined by the meta-algorithm.

11. Method according to claim 1, wherein the calculation algorithms comprise learning calculation algorithms.

12. Method according to claim 1, wherein the calculation algorithms comprise parametric calculation algorithms.

13. Method according to claim 12, wherein the calculation algorithms comprise analytical calculation algorithms.

14. Method according to claim 1, wherein said processing, using at least one learning meta-algorithm, comprises:
   calculating a first matching level between two identification codes to be compared by a first matching level calculation algorithm;
   calculating at least a second matching level between said two identification codes to be compared by a second matching level calculation algorithm;
   combining, by the learning meta-algorithm, said first calculated matching level and said second calculated matching level, each weighted by a respective weight parameter, to estimate the matching level of each comparison,
   wherein each of the weight parameters is defined on the basis of a level of reliability of the respective matching level calculation algorithm.

15. Method according to claim 1, wherein said learning meta-algorithm and said matching level calculation algorithms belong to the set comprising:
   Support Vector Machines, Restricted Boltzmann Machines, pattern mining algorithms, Bayesian algorithms, Markov models, neural networks, boosting techniques, evolutive algorithms, algorithms using Locally Weighted Linear Regression, algorithms employing space dimension reduction techniques, collaborative filtering algorithms.

16. Method according to claim 15, wherein the learning meta-algorithm is a Support Vector Machine type or Restricted Boltzmann Machine type.

17. Method according to claim 15, wherein the two or more matching level calculation algorithms are different from each other, each being one of the algorithms of the set comprising:

pattern mining algorithms, Bayesian algorithms, Markov models, neural networks, boosting techniques, evolutive algorithms, algorithms using Locally Weighted Linear Regression, algorithms employing space dimension reduction techniques, collaborative filtering algorithms.

18. System for quick recognition of a user of a service, by means of identification codes derivable from biometric data, comprising:

a. at least one recognition terminal, comprising:
    a biometric data acquisition device configured to acquire at least one biometric datum correlated to a configuration of the user's blood vessels, wherein the biometric data acquisition device comprises a digital acquisition device configured to acquire a digital image of a hand of the user;
    a first terminal processor operatively connected to the biometric data acquisition device to receive the at least one acquired biometric datum, and configured to encode the at least one acquired biometric datum into a recognition identification code of the user, at a recognition event of the user;
b. a data storage configured to store a plurality of registered registration identification codes;
c. a recognition apparatus, operatively connected to the recognition terminal, to receive the recognition identification code generated by said recognition terminal, and further operatively connected to the data storage to access the registered registration identification codes, said recognition apparatus comprising a recognition processor configured to:
    prepare, on the basis of said registered registration identification codes, a comparison set comprising a plurality of comparison identification codes;
    comparing the recognition identification code with each of the plurality of comparison identification codes;
    estimating, for each of said comparisons, a respective matching level, by means of processing performed applying at least one learning algorithm;
    recognizing or refusing recognition of the user to be recognized on the basis of the estimated matching levels,
    wherein said at least one learning algorithm comprises a learning meta-algorithm configured to estimate the matching level of each comparison and to determine or not the recognition of the user to be recognized, on the basis of results generated by two or more different matching level calculation algorithms.

19. System according to claim 18, further comprising at least one registration terminal, comprising:
    a second biometric data acquisition device configured to acquire at least one biometric datum correlated to a configuration of the user's blood vessels;
    a second terminal processor operatively connected to the second biometric data acquisition device to receive the at least one acquired biometric datum, said second terminal processor being configured to encode the at least one acquired biometric datum into a registration identification code of the user, at a registration event of the user;
    wherein the data storage is further operatively connected to the registration terminal, to receive the registration identification code generated by said registration terminal, at the registration event.

20. System according to claim 19, wherein the registration terminal, configured to carry out registration events, and the recognition terminal, configured to carry out recognition events, comprise a single acquisition and encoding device configured to operate as first terminal processing means and as second terminal processing means.

21. System according to claim 18, further comprising a signalling device, operatively connected to the recognition apparatus to receive an indication of recognition or non-recognition, and configured to signal the indication of recognition or non-recognition.

22. System according to claim 18, wherein the biometric data acquisition device is configured to acquire an infra-red image of a user's hand, and comprises at least one infra-red sensor, operating in the infra-red and near infra-red spectrum band, configured to detect presence of oxygen in zones corresponding to the presence of blood vessels in the hand, so as to obtain a corresponding representation of a geometry of the blood vessels of the hand.

23. Service delivery system for providing services conditional to the recognition of a registered user, comprising:
    a service delivery device configured to provide a service;
    a system for quick recognition of a user according to claim 18,
    wherein the recognition processor is further configured to send to the recognition terminal an indication of recognition or non-recognition of the user,
    and wherein the recognition terminal is co-located with and operatively connected to the service delivery device to transmit to the service delivery device said indication of recognition or non-recognition,
    and wherein the service delivery device is configured to provide the service only if it have received said indication of recognition.

24. Service delivery system according to claim 23, wherein the service delivery system is a POS system for providing POS services.

25. Service delivery system according to claim 23, wherein the service delivery system is an ATM system for providing ATM services.

* * * * *